US 12,189,958 B2

United States Patent
Kim et al.

(10) Patent No.: US 12,189,958 B2
(45) Date of Patent: Jan. 7, 2025

(54) ACCESSING MEMORY DEVICES VIA SWITCHABLE CHANNELS

(71) Applicant: Micron Technology, Inc., Boise, ID (US)

(72) Inventors: Chulbum Kim, San Jose, CA (US); Sundararajan Sankaranarayanan, Fremont, CA (US); Xiangyu Tang, Mountain View, CA (US); Dustin J. Carter, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/898,160

(22) Filed: Aug. 29, 2022

(65) Prior Publication Data

US 2024/0069738 A1   Feb. 29, 2024

(51) Int. Cl.
  *G06F 3/06*   (2006.01)
(52) U.S. Cl.
  CPC .......... *G06F 3/0613* (2013.01); *G06F 3/0629* (2013.01); *G06F 3/0679* (2013.01)
(58) Field of Classification Search
  CPC ..... G06F 3/0613; G06F 3/0629; G06F 3/0679
  See application file for complete search history.

(56) References Cited

U.S. PATENT DOCUMENTS

| | | | |
|---|---|---|---|
| 10,713,334 B1* | 7/2020 | Himelstein | G05B 19/0421 |
| 10,990,517 B1* | 4/2021 | Verma | G06F 12/0238 |
| 2003/0158966 A1* | 8/2003 | Sato | H04L 67/1097 |
| | | | 709/242 |
| 2014/0136751 A1* | 5/2014 | Chang | G06F 13/1657 |
| | | | 710/317 |

* cited by examiner

*Primary Examiner* — Baboucarr Faal
(74) *Attorney, Agent, or Firm* — LOWENSTEIN SANDLER LLP

(57) ABSTRACT

A memory sub-system includes a memory sub-system controller comprising a plurality of controller channels, one or more memory devices, each of which comprises a respective plurality of memory dies, and a channel switch circuit coupled between the plurality of the controller channels and a plurality of memory channels of the one or more memory devices, where each memory channel corresponds to a respective one of the plurality of memory dies of one of the memory devices, the channel switch circuit comprising command processing logic configured to: receive, from the memory sub-system controller, a plurality of channel mappings, each of which identifies a particular one of the controller channels and a particular one of the memory channels, and route data from each controller channel to a respective one of the memory channels that is associated with the controller channel by a respective one of the channel mappings.

20 Claims, 8 Drawing Sheets

700

Receiving, from a memory sub-system controller, a plurality of channel mappings, wherein each channel mapping identifies a particular one of a plurality of controller channels and a particular one of a plurality of memory channels
710

Configuring a channel switch circuit to route data from each controller channel of the plurality of controller channels to a respective one of the memory channels that is associated with the controller channel by a respective one of the channel mappings
720

Receiving, on a particular one of the controller channels, a write request or a read request from the memory sub-system controller
730

Transferring data between the particular one of the controller channels and a particular one of the memory channels in accordance with the write request or the read request, wherein the particular one of the memory channels is identified by a channel mapping that also identifies the particular one of the controller channels
740

FIG. 7

ACCESSING MEMORY DEVICES VIA SWITCHABLE CHANNELS

TECHNICAL FIELD

Embodiments of the disclosure relate generally to memory sub-systems, and more specifically, relate to accessing memory devices via switchable channels.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure. The drawings, however, should not be taken to limit the disclosure to the specific embodiments, but are for explanation and understanding only.

FIG. 7 is a flow diagram of an example method to map memory controller channels to memory channels and transfer data between the controller channels and memory channels in accordance with some embodiments.

DETAILED DESCRIPTION

Figure 1:
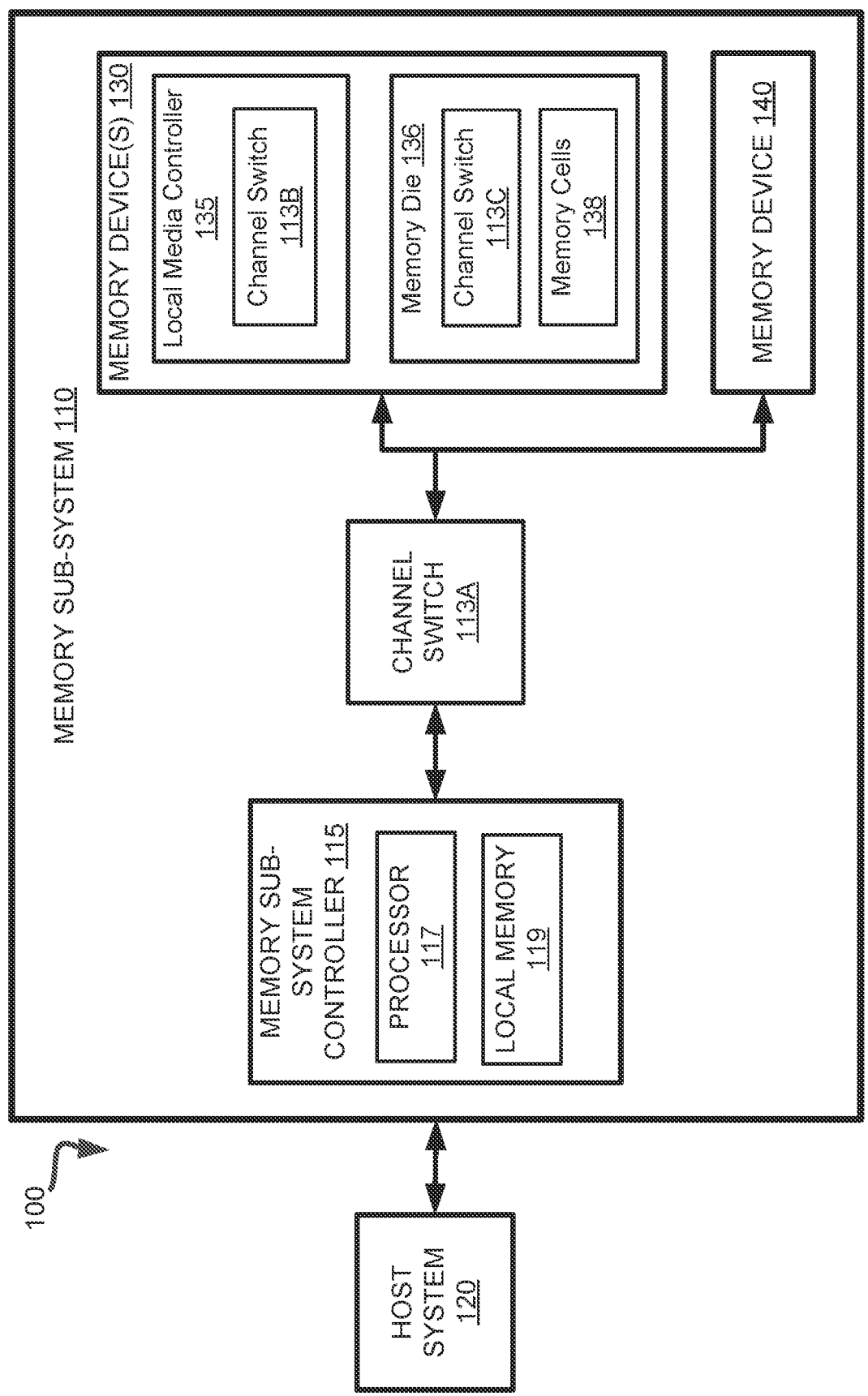
FIG. 1 illustrates an example computing system that includes a memory sub-system in accordance with some embodiments of the present disclosure.

Aspects of the present disclosure are directed to accessing memory devices via switchable channels. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device that includes an array of non-volatile memory cells. A 3D cross-point memory device can perform bit storage based on a change of bulk resistance, in conjunction with a stackable cross-gridded data access array. Another example is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Memory access operations can be performed by the memory sub-system. The memory access operations can be host initiated or memory sub-system controller initiated. For example, the host system can initiate a memory access operation (e.g., write operation, read operation, erase operation, etc.) on a memory sub-system. The host system can send memory access commands (e.g., write command, read command) to the memory sub-system, such as to store data on a memory device in the memory sub-system, or to read data from the memory device in the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc. Memory access operations initiated by the memory sub-system controller can relate to maintenance operations, such as garbage collection, wear leveling, bad block management, block refresh operations, etc.

A non-volatile memory device, such as a package, can include a number of individual dies. The memory device can include a number of "memory channels" via which other system components, such as the memory sub-system controller, can communicate with the logical units (e.g., dies) of the memory device. The memory sub-system controller can include a number of input/output (I/O) ports each having a corresponding "controller channel." The memory sub-system controller can use the controller channels to communicate with logical units of one or more memory devices via the memory channels of the memory devices. Depending on the embodiment, memory sub-system controller, can have two host channels, four host channels, eight host channels, or some other number of host channels.

Data transfer can be performed on one of the memory channels of a memory device, e.g., to or from one of the dies, at a particular time. In particular examples, a memory device can provide 2, 4, or 8 memory channels, each of which can be interfaced with a particular controller channel. A memory sub-system can interface the controller channels of the memory sub-system controller with the memory channels of the memory device so that the controller can communicate with the memory devices. For example, the memory sub-system controller can be connected to each memory device via one or more bidirectional buses.

The controller channels can be used to perform multiple active memory access operations concurrently. The number of active memory access operations (e.g., reads or writes) can be limited by the number of controller channels. For example, if eight controller channels are available, up to eight memory access operations can be performed concurrently, provided that there are at least 8 memory channels. In particular examples, each controller channel can interface with one of a set of memory dies of a memory unit. Each individual memory die can be configured as an individual logic unit (LU), identified by a unique logical unit number (LUN). Thus, a system with eight controller channels, and 16 LUs per channel, can include 128 separate LUs. The particular logical unit to be used in a memory operation can be selected using a memory addressing component, which can select particular logical units of a memory device by applying control signals to the memory device's I/O interface.

A switch can be used between the memory sub-system controller and the memory devices to map each controller channel to a specified memory channel. The switch enables the controller to specify a mapping between the controller channels and the memory channels. The mapping can associate each controller channel with a respective memory channel with which each controller channel is to communicate in memory access operations. For example, if the memory sub-system has fewer controller channels than memory channels, the switch can enable each controller channel to be mapped to some of the memory channels.

Thus, the switch can provide an interface between the memory sub-system controller, or a component of the memory sub-system controller, and the non-volatile memory device. The switch can use one or more buses, multiplexers, de-multiplexers, and/or other suitable components to map controller channels to memory channels according to a specified mapping and provide communication between each mapped controller channel and the respective memory channel to which the controller channel is mapped. For example, a switch can be interfaced with two controller channels of the memory sub-system controller, and with eight memory channels (e.g., corresponding to eight dies) of a memory device. The switch can map each of the controller channels to some of the memory channels. The particular mapping can be specified by the memory sub-system controller. The switch can then provide a communication link between each mapped controller channel and the channel to which the controller channel is mapped.

However, such switches can have utilization restrictions that prevent certain combinations of available controller channels from being used concurrently. For example, in a memory sub-system with a large number of memory dies, there can be restrictions on the switch's ability to provide communication channels between the controller channels and the memory dies because of limited chip area for interconnection circuitry, or other factors. For example, a switch that connects two controller channels of the memory sub-system controller to eight memory dies (e.g., eight LUs) may be able to provide a channel between the first controller channel and one of a first subset of the memory dies (e.g., die numbers 1-4), and another channel between the second controller channel and one of a second subset of the memory dies (e.g., dies numbers 5-8). Thus, the switch cannot provide a channel between the first controller channel and any of the second subset of memory dies. Such restrictions can reduce the number of channels that can be in use simultaneously, e.g. in cases where both controller channels are requested to access memory dies in the first subset. Such utilization restrictions on the memory dies that can be addressed by particular controller channels can thus reduce bandwidth between the memory sub-system controller and the memory devices in the memory sub-system.

Aspects of the present disclosure address the above and other deficiencies by using a channel switch that can enable communication between a set of channels of a memory sub-system controller ("controller channels") and any available memory channel of one or more memory devices ("memory channels". Each memory channel can provide access to one or more dies of a memory device. The memory switch can route data between the controller channels and the memory channels according to a set of channel mappings that can be specified as input to the channel switch. The controller can determine the channel mappings based on usage of the controller channels and memory channels. The controller can then provide the determined channel mappings to the channel switch.

The channel switch can receive the channel mappings from the memory sub-system controller via a communication protocol or via digital circuit inputs. The channel mappings can be sent via the communication protocol as, for example, channel identifiers specified in a control command, or channel identifiers specified in a memory read or write command. If the channel switch is implemented as a chip that is separate from the memory sub-system controller, the digital circuit inputs can be pins of the chip, for example. The switching system can then configure multiplexer or other data routing component to route data between the command channels and the memory channels according to the mappings. For example, to read data from a particular memory location, the controller can send a channel mapping via one of the controller channels to the channel switch. The channel mapping can specify the controller channel via which the controller will read the data and the memory channel that corresponds to the memory unit in which data to be read is located.

Advantages of the present disclosure include, but are not limited to, enabling a memory sub-system controller to perform I/O operations on multiple controller channels and multiple mapped memory channels without limitation on which of the memory channels can be accessed via from particular controller channels. The disclosed channel switch can transfer data on multiple controller channels concurrently between the controller and memory device(s). Data transfers are not limited to certain combinations of controller channels and memory channels. For example, the channel switch can transfer data on two controller channels between the controller and two different memory dies of a single memory device. Removing limitations on the supported combinations of controller channels and memory channels enables the switch to perform concurrent memory access operations for more combinations of controller channels and logical units. This increased flexibility can lead to improved performance and utilization of the memory sub-system, thereby reducing latency and increasing the throughput of with I/O operations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include one or more channel switches 113A, 113B, 113C that can be used to route data between the memory sub-system controller 115 and the memory device(s) 130. For example, the channel switch 113A can route data from the controller 115 to and/or from one or more memory devices 130 using two using two controller channels of the controller 115 to or from respective channels of the memory device(s) 130. The respective channels can be determined according to a channel mapping, which can be provided to the channel switch 113A by the controller 115. Each memory device 130 can include multiple individual NAND memory die to or from which the channel switch 113A can route signals, e.g., data, according to the mappings. A particular one of the dies in a memory device 130 can be selected, e.g., by the channel switch 113A, based on a memory address associated with the signals being routed. The signals can include electrical levels that represent data, for example.

In one embodiment, the channel switch 113A can be implemented as a chip that is separate from the memory sub-system controller 115 and separate from the memory device(s) 130. For example, the channel switch 113A can be implemented as a chip on a printed circuit board of the memory sub-system 110. In other embodiments, the channel switch 113 can be implemented in another portion of the memory sub-system 110. For example, in another embodiment, the channel switch 113B can be implemented in the same package as the memory device and outside the memory die in the package. In still another embodiment, the channel switch 113C can be implemented on the memory die in the package. Further details relating to the operations of the channel switch 113 are described below.

Figure 2:
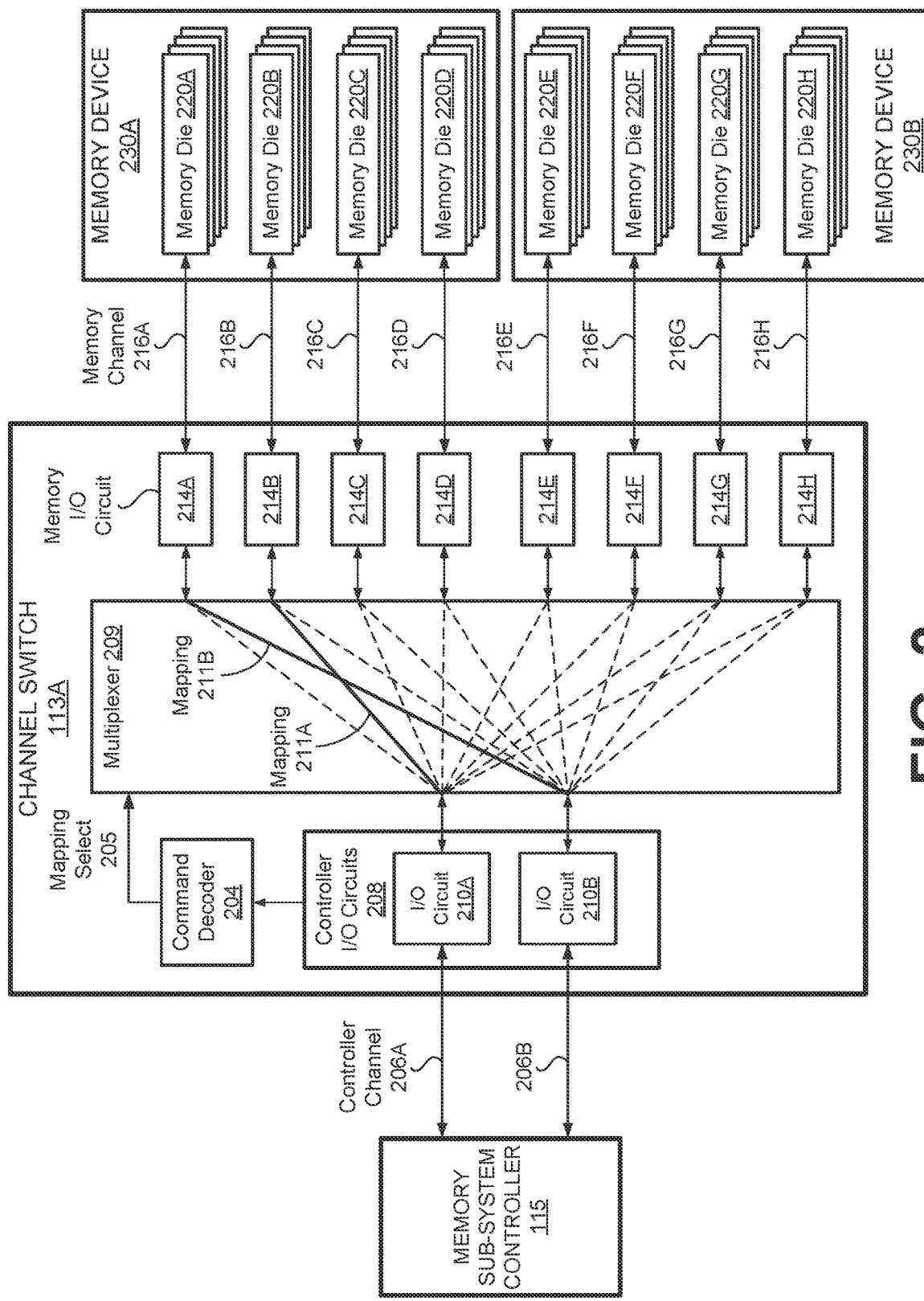
FIG. 2 is a block diagram illustrating an example memory channel switch in accordance with some embodiments.

FIG. 2 is a block diagram illustrating an example memory channel switch in accordance with some embodiments. In one embodiment, memory sub-system controller 115 includes a number of controller input/output ports, each having a corresponding controller channel. For example, two controller channels 206A, 206B can be connected to memory sub-system controller 115. Depending on the embodiment, memory sub-system controller 115, can have one controller channel, two controller channels, four controller channels, eight controller channels, or some other number of controller channels. As the number of controller input/output ports and controller channels increases, so too does the complexity, cost, and size of the memory sub-system controller 115. Thus, it can be desirable to limit the number of controller input/output ports and channels in the memory sub-system controller 115.

The controller channels 206 can be connected to a set of one or more controller I/O circuits 208 of the channel switch 113A. The controller I/O circuits 208 can include a first controller I/O circuit 210A and a second controller I/O circuit 210B. Each controller I/O circuit 210 can send and/or receive signals to the controller 115 via the respective controller channel 206. Further, each controller I/O circuit 210 can send and/or receive signals to the multiplexer 209. The multiplexer 209 can route data between the controller channels 206 and memory channels 216 according to one or more specified mappings 211. Each mapping 211 can indicate which controller channel 206 is to be routed to which memory channel 216. Each memory channel 216 can be connected to one or more respective memory dies 220 of a memory device 230.

Thus, the channel switch 113A can route data between each controller channel 206 and a respective memory die 220 of a memory device 230 via a controller I/O circuit 210 connected to a controller channel 206 and the multiplexer 209, the multiplexer 209, and a memory I/O circuit 214 connected to the respective memory die 220. The channel switch 113 can route data on two or more mappings 211 concurrently. In the example illustrated in FIG. 2, the channel switch 113A can route data to eight memory dies 220A-220H via eight memory I/O circuits 214A-214H that are connected to the multiplexer 209 and to respective memory channels 216A-216H. Four of the memory dies (220A-220D) are in a first memory device 230A, and four of the memory dies (220E-220H) are in a second memory device 230B.

In one embodiment, each memory channel 216 is connected to the same number of memory dies 220, e.g., 4 memory dies for each memory channel 216. In other embodiments, however, each memory channel 216 from the same channel switch 113 can be connected to a different number of memory dies 220. For example, one memory channel 216 could be connected to two memory dies, while another memory channel 216 could be connected to four memory dies.

As an example, in response to receiving a read request from the controller 115, the channel switch 113A can route data from one of the memory dies 220A to one of the controller channels 206. As another example, in response to receiving a write request from the controller 115, the channel switch 113A can route data from one of the controller channels 206 to one of the memory dies 220. The channel switch 113 can route data for two or more requests concurrently by using a first controller channel 206, a first controller I/O circuit 210, a first mapping in the multiplexer 209, a first memory I/O circuit 214, a first memory channel 216, and a first memory die 220 for the first request, and using a second controller channel 206, a second controller I/O circuit 210, a second mapping in the multiplexer 209, a second memory I/O circuit 214, a second memory channel 216, and a second memory die 220 for a the second request.

For example, the controller 115 can send a first mapping control command to the channel switch 113A via one of the controller channels 206 specifying a mapping 211A between the first controller channel 206A and the second memory die 220B. The controller 115 can send a second mapping control command via one of the controller channels 206 specifying a mapping 211B between the second controller channel 206B and the first memory die 220A. Both memory dies 220A and 220B are in the same memory device 230A.

Two example mappings 211A, 211B are shown in FIG. 2. A first mapping 211A specifies that the controller channel 206A is mapped to the memory channel 216B, and a second selected mapping 211B specifies that the controller channel 206B is mapped to the memory channel 216A. Subsequent memory read or write requests sent by the controller 115 to the channel switch 113A on controller channel 206A can cause data to be read from or written to memory die 220B in accordance with the mapping 211A. Further, subsequent memory read or write requests sent by the controller 115 to the channel switch 113A on controller channel 206B can cause data to be read from or written to memory die 220A in accordance with the mapping 211A. Subsequent mapping control commands can change the mappings 211. In other examples, each memory read or write request can specify a mapping that is used by the channel switch 113A to perform the memory read or write operation.

A command decoder 204 can identify commands in the data received via at least one of the controller I/O circuits 210. The commands can include control commands, such as a mapping control command that can specify a mapping between a controller channel 206 and memory channel 216. The command decoder 204 can decode commands received from other sources, such as mapping selection pins, as described below. The command decoder 204 can generate a mapping select signal 205 that represents the received mapping, and provide the mapping select signal 205 to a multiplexer 209. The mapping represented by the mapping select signal 205 can identify a controller channel 206 and a memory channel 216. Thus, the mapping specifies that the multiplexer 209 is to route data between the controller channel 206 identified by the mapping and the memory channel 216 identified by the mapping. The mapping can identify the controller channel 206 and memory channel 216 by specifying a controller channel identifier and a memory channel identifier, for example. The mapping select signal 205 can specify multiple mappings, and each mapping can cause the multiplexer 209 to route data between a controller channel 206 and a memory channel 216 specified in the mapping, e.g., by establishing a logical path or connection between each controller channel 206 and memory channel 216 specified in the mapping.

In one embodiment, channel switch 113A can include one or more controller ports (not shown), including a controller port for each controller channel 206. Each controller port can be configured to couple to the corresponding controller channel 206. Each controller I/O circuit 210 can be, for example, a buffer, which can be coupled to or form at least a portion of a respective controller port.

Further, the channel switch 113A can include one or more memory ports (not shown), including a memory port for each memory channel 216. Each memory port can be configured to couple to the corresponding memory channel 216. Each memory I/O circuit 214 can be, for example, a buffer, which can be coupled to or form at least a portion of a respective memory port.

In one embodiment, the channel switch 113A can be implemented in a separate circuit coupled between memory sub-system controller 115 and memory device(s) 230, or elsewhere in the memory sub-system 110. In other embodiments, the channel switch 113A can be implemented in other portions of the memory sub-system 110, as described in further detail below.

Although particular numbers of controller channels, mappings, memory channels, memory devices, and memory dies are shown in the examples described herein, any suitable number of controller channels, mappings, memory channels, memory devices, and/or memory dies can be used in other examples.

Figure 3:
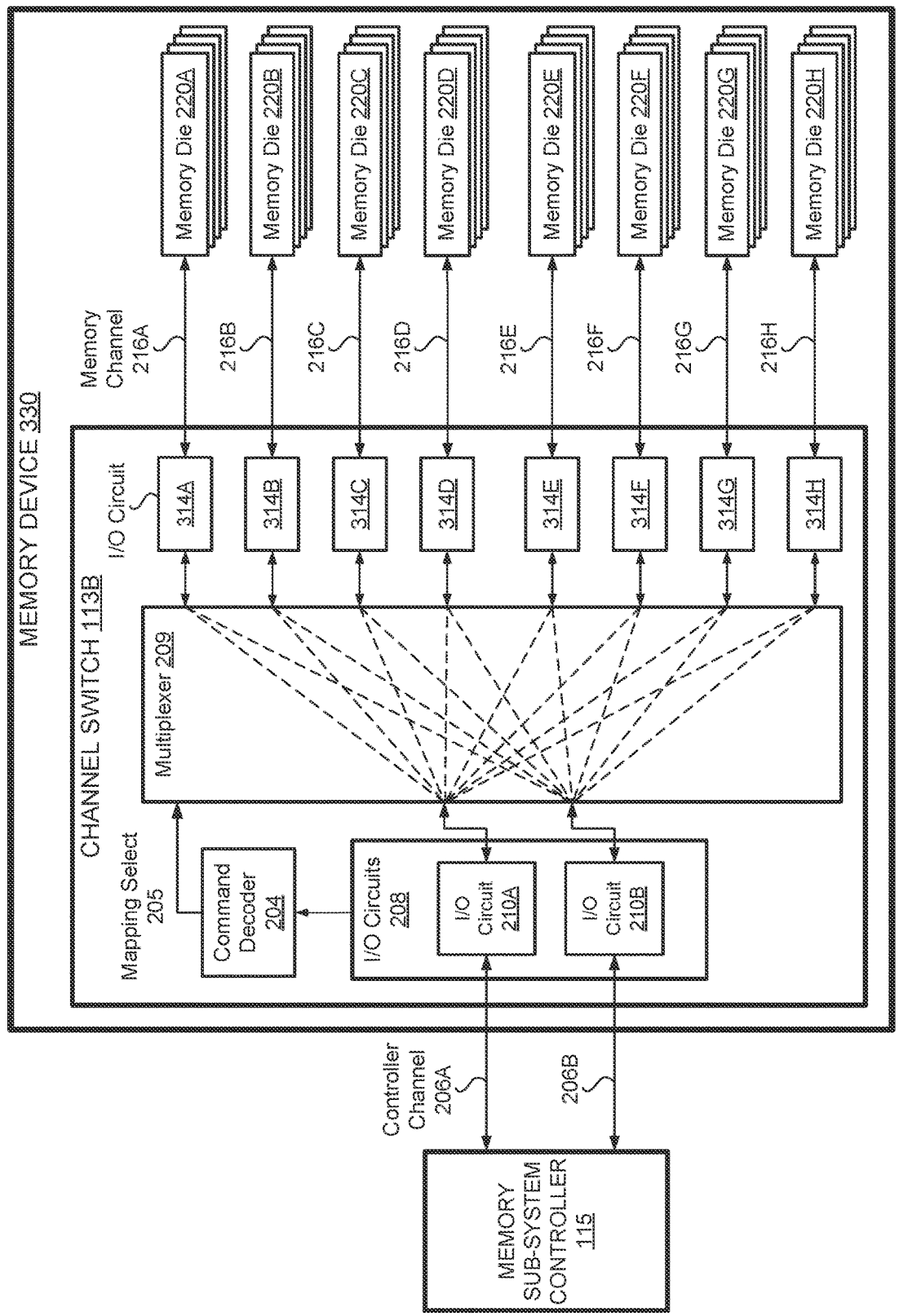
FIG. 3 is a block diagram illustrating an example memory channel switch located on a memory device in accordance with some embodiments.

FIG. 3 is a block diagram illustrating an example memory channel switch 113B located on a memory device 330 in accordance with some embodiments. In one embodiment, the channel switch 113B can be implemented in the same package as the memory device 330 and outside the memory die 220 in the package. The channel switch 113B of FIG. 3 is similar to the channel switch 113A of FIG. 2, but is implemented in the same package as the memory device 330. As such, the channel switch 113B the memory die 220, and the memory channels 216 that connect the channel switch 113B to the memory die 220 are implemented in the memory device 330. The controller channels 206 connect the controller 115 to the memory device 330. The controller channels 206 can thus be part of the package's interface, e.g., pins that can be connected to the controller 115.

The channel switch 113B can include a command decoder 204, controller I/O circuits 208, and multiplexer 209 similar to those shown in FIG. 2. The channel switch 113B can include one or more controller ports (not shown), similar to those described above with respect to FIG. 2.

The channel switch 113B can include one or more memory I/O circuits 314. In one embodiment, the memory I/O circuits 314 can be similar to the memory I/O circuits 214 of FIG. 2 (e.g., buffers that can be coupled to or form at least a portion of respective memory ports). In another embodiment, the memory I/O circuits 314 can be any suitable interfaces between the multiplexer 209 and the memory channels 216 in the memory device 330. Each memory I/O circuit 314A-314H of the channel switch 113B is connected to one or more respective memory dies 220A-220H via a respective memory channel 216A-206H.

Figure 4A:
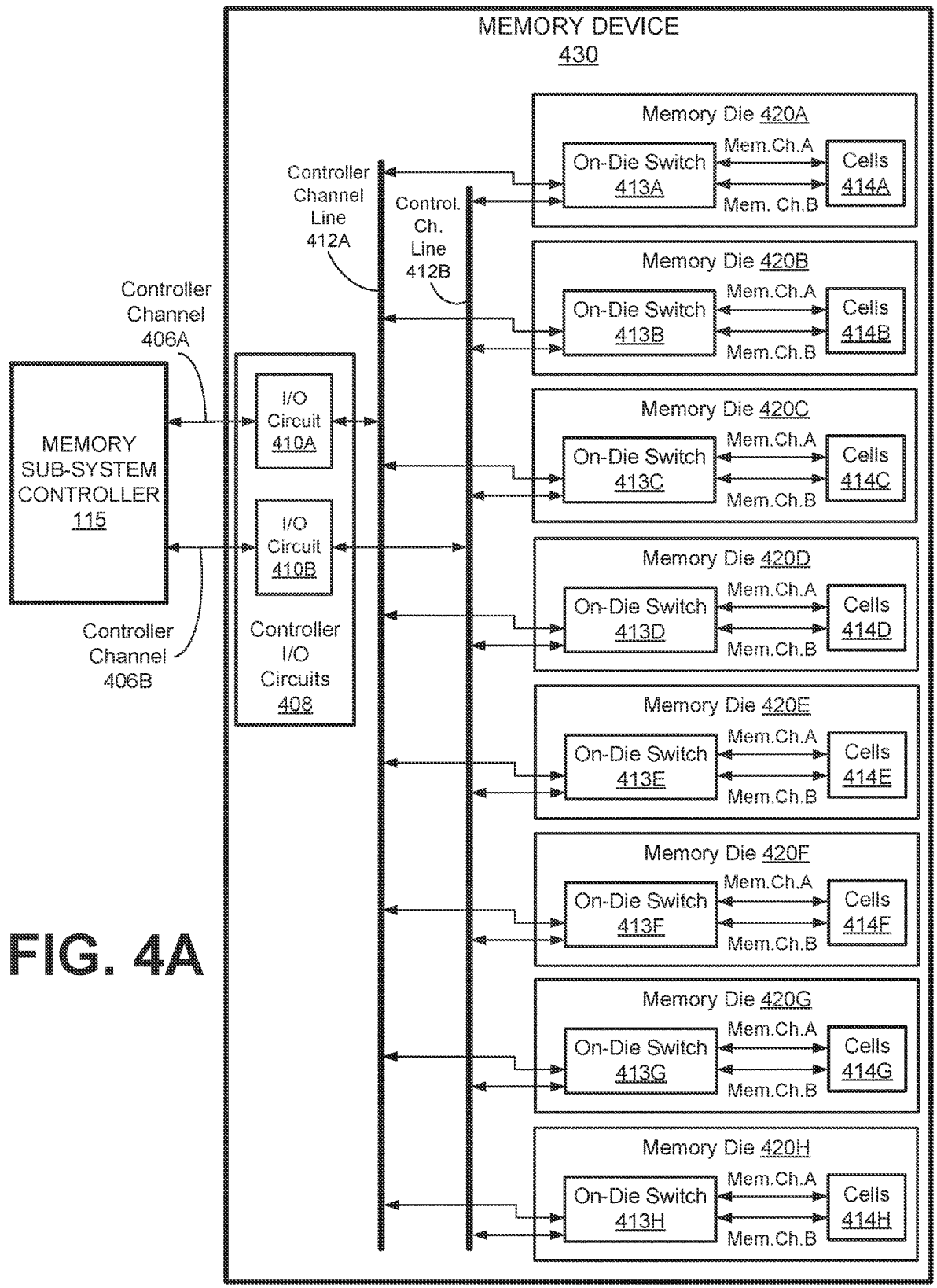
FIG. 4A is a block diagram illustrating example memory channel switches located on dies of a memory device in accordance with some embodiments.

FIG. 4A is a block diagram illustrating example memory channel switches 413 located on dies 420 of a memory device 430 in accordance with some embodiments. In one embodiment, one of the channel switches 413A-H can be implemented on each respective memory die 420A-H of a memory device 430. A controller 115 can be connected to the memory device 430 via controller channels 406A, 406B. The controller channels 406 are connected to controller I/O circuits 408, which include a first controller I/O circuit 410A and a second controller I/O circuit 410B. The controller I/O circuits 410A, 410B can be similar to the controller I/O circuits 210A, 210B of FIG. 2, for example. The controller I/O circuits 408 are further connected to controller channel lines 412. Thus, the controller I/O circuits 410 convert signals on controller channels 406 to and from signals on respective controller channel lines 412. Each controller channel line 412 is connected to each on-die switch 413.

There are two controller I/O circuits 408 in the example of FIG. 4A, so each controller channel 406A, 406B is connected to a respective controller I/O circuit 410A, 410B.

Each controller I/O circuit 410A, 410B is connected to a respective controller channel line 412A, 412B. Each controller channel line 412A, 412B is connected to each on-die switch 413A-413H. Each on-die switch 413A-413H is connected to a respective set of memory cells 414A-414H by two memory channels 416 (as shown in further detail in FIG. 4B).

Although a particular number of controller channels 406, I/O circuits 410, on-die switches 413 and respective memory dies 420 are shown in the example of FIG. 4A, any suitable number of on-die switches 413 and respective memory dies 420 can be used in other examples.

Figure 4B:
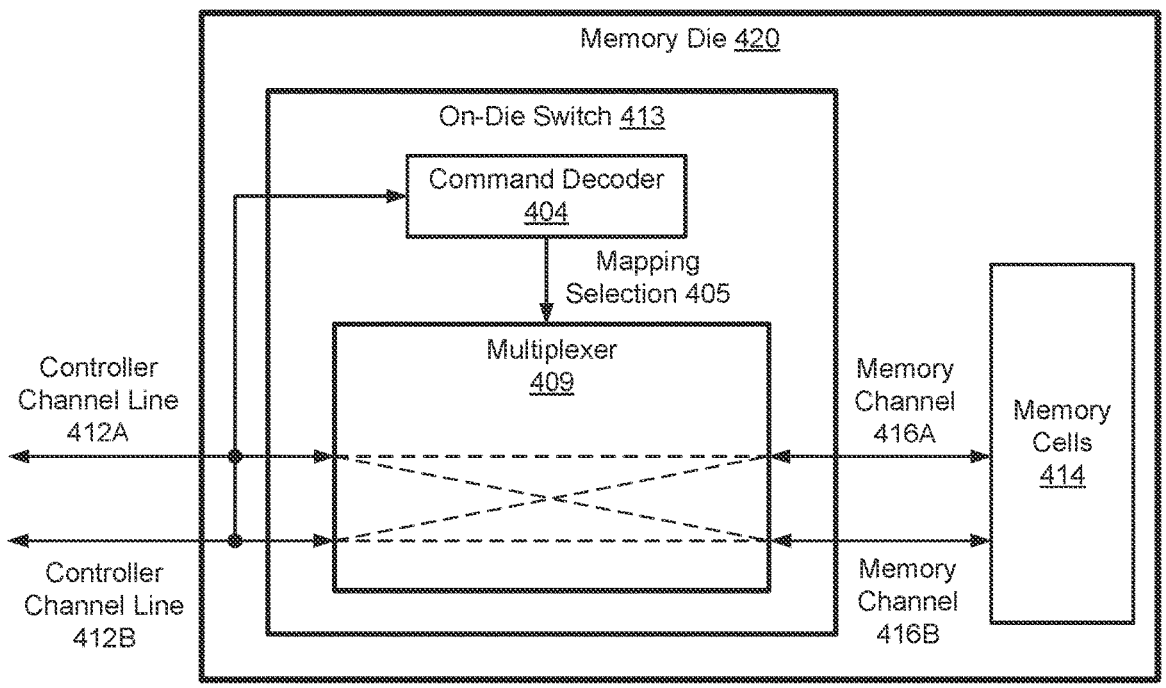
FIG. 4B is a block diagram illustrating an example on-die memory channel switch in accordance with some embodiments.

FIG. 4B is a block diagram illustrating an example on-die memory channel switch 413 in accordance with some embodiments. In one embodiment, a memory die 420 includes an on-die switch 413 that includes a command decoder 404 and a multiplexer 409. The command decoder 204 can decode commands from the controller channel line(s) 412 and generate a mapping select signal 405 that represents a received mapping. The mapping select signal 405 can be generated by the command decoder 404, e.g., as described above with respect to the command decoder 204 of FIG. 2. A command decoder 404 can be on each die, so that each die can determine which die is to drive which channel. Input for the command decoder 204 can be from the controller, e.g., via mapping or address fields in a protocol received via the controller channel line(s) 412 and/or from one or more pins. The pins can be, for example, controller channel selection pins and/or memory channel selection, as described below with respect to FIG. 5. The pins can be, for example, input pins of the memory die 420, and can connect controller channel select lines to the command decoder 404, similarly to the selection pin connections described below with respect to FIG. 5. The multiplexer 409 routes the controller channel lines 412A, 412B to memory channels 416A, 416B according to the mapping specified by the mapping select signal 405. The memory channels 416A, 416B are connected to memory cells 414 and can be used to read and/or write data to/from the memory cells 414. A read or write operation can be performed on each memory channel 416 concurrently. The multiplexer 409 can route controller channel line 412A to either memory channel 416A or memory channel 416B. Similarly, the multiplexer 409 can route controller channel line 412B to either memory channel 416A or memory channel 416B. Ordinarily, each controller channel line 412 is routed to a different memory channel 416.

Figure 5:
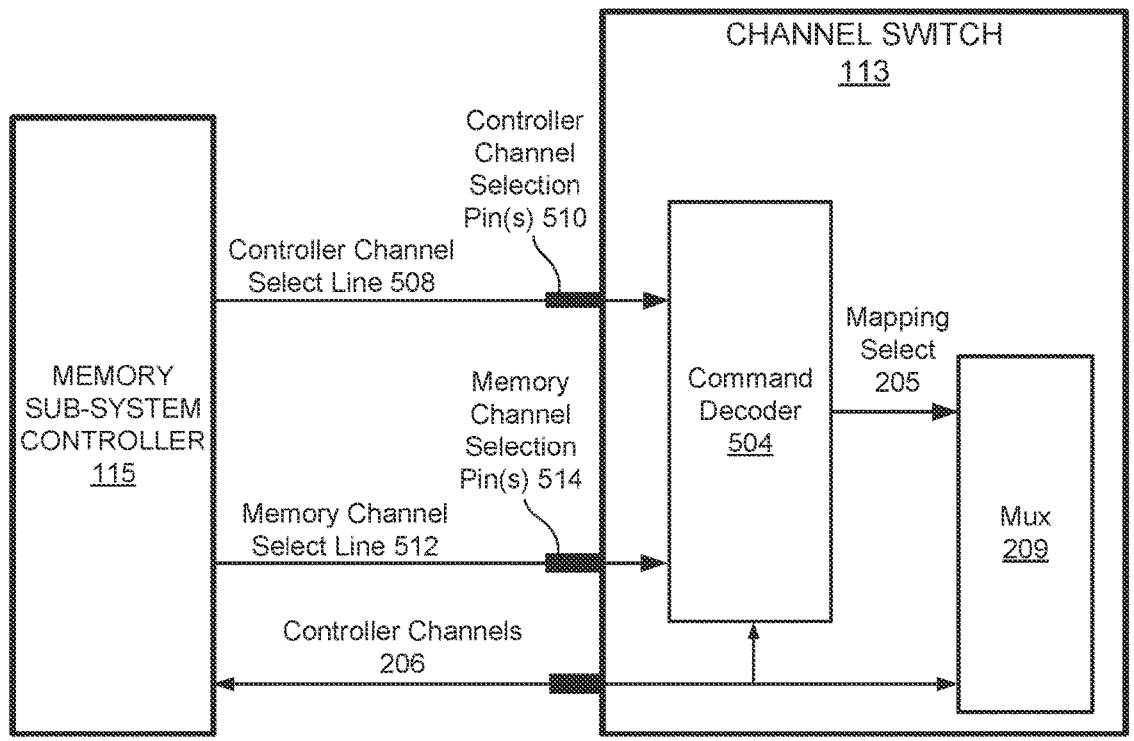
FIG. 5 is a block diagram illustrating an example channel switch having channel selection pins in accordance with some embodiments.

FIG. 5 is a block diagram illustrating an example channel switch 113 having channel selection pins 510, 514 in accordance with some embodiments. In one embodiment, the channel switch 113 can receive one or more channel mappings on the channel selection pins 510, 514. The channel mappings can be specified by a controller 115 as control signals sent to the channel selection pins 510, 514 via respective controller channel select line(s) 508 and memory channel select line(s) 512. The control signals can have logical levels that represent the mappings. For example, particular logical levels can represent an identifier value such as "1", and other logical levels can represent an identifier value such as "2". Thus, to determine the mappings, the channel switch 113 can determine one or more logical levels, each from one of the one or more of the pins 510, 514. The channel switch 113 can then determine the at least one of the plurality of channel mappings based on the one or more logical levels The channel switch 113 can include a command decoder 504 that receives a controller channel selection signal from the controller channel selection pin(s) 510 and/or a memory channel selection signal from the memory channel selection pin(s) 514. The controller channel selection signal can specify a particular controller channel, e.g., as a numeric identifier that corresponds to the particular controller channel. Similarly, the memory channel selection signal can specify a particular memory channel, e.g., as a numeric identifier that corresponds to the particular memory channel. The command decoder 504 can use the particular controller channel identifier and the particular memory channel identifier as a mapping, and provide the mapping to a multiplexer 209 via a mapping select line 205. For example, to map a controller channel 206A having identifier "1" to a memory channel 216B having identifier "2", the controller 115 can send the identifier value "1" to the channel switch 113 on the controller channel select line 508, and send the identifier "2" on the memory channel selection line 512. The channel switch 113 receives the value "1 at the controller channel selection pin(s) 510 and the value "2" at the memory channel selection pin(s) 514. The command decoder 504 receives the values from the pins 510, 514, and determines that the mapping is from the controller channel having identifier "1" to the memory channel having identifier "2". The command decoder 504 can then send the mapping to the multiplexer 209, e.g., as the values "1" and "2". The multiplexer 209 can route signals between the controller channel having identifier "1" (e.g., controller channel 206A) and the memory channel having identifier "2" (e.g., memory channel 216B).

The controller channel selection pin(s) 510 can include a number of pins suitable for representing the number of possible controller channels. For example, if there are two controller channels, then a single controller channel selection pin 510 can be present on the channel switch 113, since one of the two controller channels can be identified using a single bit value (e.g., a high or low logical level). As another example, if there are eight memory channels, then three memory channel selection pins 514 can be present on the channel switch 113, since one of the eight memory channels can be identified using three bit values. Other representations of the mapping are possible. For example, a numeric mapping identifier can be assigned to each possible pair of a controller channel identifier and a memory channel identifier. The pairs can be, for example, (1,1), (1, 2), (1, 3), . . . (2, 8), where the first number in the pair represents the controller channel and the second number in the pair represents the memory channel. A particular mapping, e.g., from controller channel 1 to memory channel 2, can then be specified as the mapping identifier value that corresponds to the mapping (e.g., "2" if the mapping (1, 2) is the second of the possible pairs). Alternatively, the mappings can be specified by information sent sequentially on a single mapping pin of the channel switch 113. For example, the mapping (1, 2) can be sent as a sequence of numeric values on a single mapping pin.

Figure 6A:
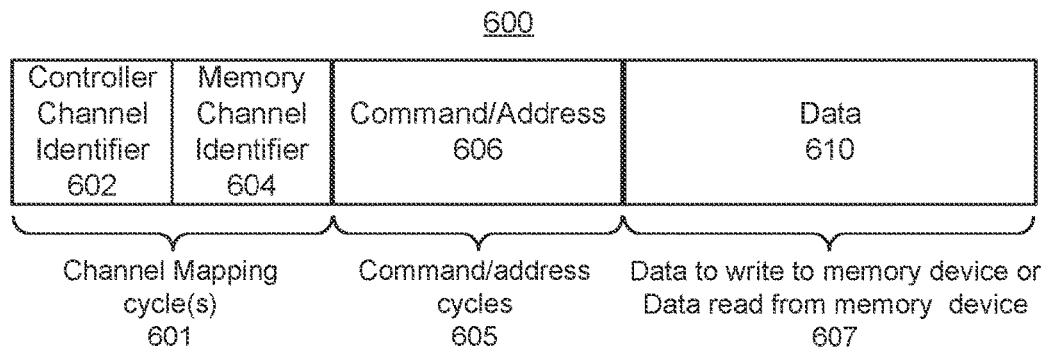
FIGS. 6A-6C illustrate example memory access protocols that send channel mappings to a channel switch in accordance with some embodiments.
Figure 6B:
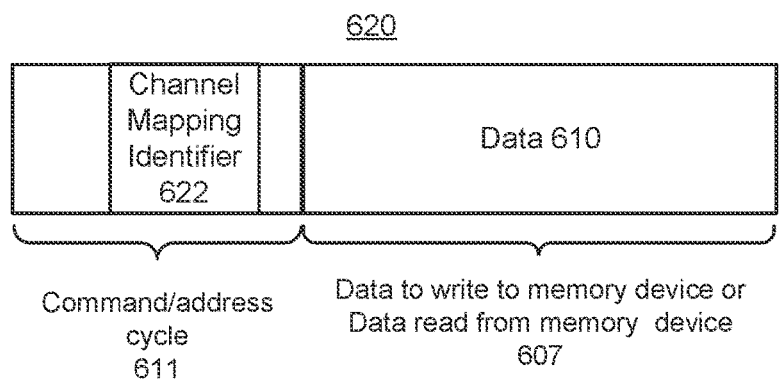
Figure 6C:
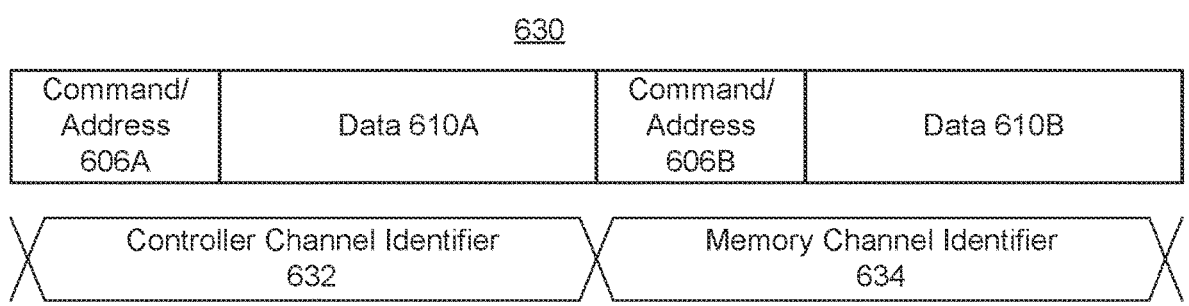

FIGS. 6A-6C illustrate example memory access protocols that send channel mappings to a channel switch in accordance with some embodiments. FIG. 6A illustrates an example of sending channel mapping data in an additional address cycle 601 from a controller 115 to a channel switch 113. A communication protocol can be used to send and receive data to and from the channel switch 113. The data can include control commands and read/write data, which can be data read from or written to memory devices 230. The communication protocol can specify that data is sent via a communication bus such as the controller channels 206 according to particular timing. The bus can be accessed in units of time referred to herein as "cycles". For example, control commands can be sent via the bus in command cycles 605, memory addresses can be sent in address cycles, and data can be sent in data cycles 607. In one embodiment, an additional cycle 601, referred to herein as a mapping cycle 601, can be used to send channel mappings. In the mapping cycle 601, a sender, such as the controller 115, can send a controller channel identifier 602 and a memory channel identifier 604. The channel switch 113 can receive the controller channel identifier 602 and a memory channel identifier 604 via a controller channel 206 during a channel mapping cycle. A command decoder 204 of the channel switch 113 can receive the mapping data and generate a mapping 211 from the mapping data.

FIG. 6B illustrates an example of sending channel mapping data in an unused reserved portion 622 of a command/address cycle 611 from a controller 115 to a channel switch 113. The channel mapping data included in the unused reserved portion 622 can be, for example, a numeric identifier associated with a particular pair of a controller channel identifier and a memory channel identifier, as described above with respect to FIG. 5. As another example, the data included in the unused reserved portion 622 can include a controller channel identifier and a memory channel identifier that together represent a mapping between a controller channel and a memory channel.

FIG. 6C illustrates an example of sending channel mapping data via one or more pins or circuit lines, such as the controller channel selection pin(s) 510, memory channel selection pin(s) 514, or other pin(s). In one embodiment, a sender, such as a controller 115, can send a controller channel identifier on controller channel selection pin(s) 510 during one or more first bus cycles 632. The first bus cycles 632 can be, for example, one or more cycles during which a command/address 606A and data 610A are sent. Further, the sender can send a memory channel identifier on memory channel selection pins 514 during one or more second bus cycles 634.

Alternatively, if the controller channel identifier 632 and the memory channel identifier 634 are sent at different times (as shown in FIG. 6C), the sender can send the memory channel identifier 634 on the same pins as the controller channel identifier 632. In another example, the sender can send the controller channel identifier on the controller channel selection pin(s) 510 and send the memory channel identifier concurrently on the memory channel selection pin(s) 514.

FIG. 7 is a flow diagram of an example method 700 to map memory controller channels to memory channels and transfer data between the controller channels and memory channels in accordance with some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the channel switch 113A, 113B, or 113C of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic can receive, from a memory sub-system controller, a plurality of channel mappings, wherein each channel mapping identifies a particular one of a plurality of controller channels and a particular one of a plurality of memory channels. At operation 720, the processing logic can configure a channel switch circuit to route data from each controller channel of the plurality of controller channels to a respective one of the memory channels that is associated with the controller channel by a respective one of the channel mappings. The channel switch circuit can include a plurality of controller channel Input/Output (I/O) circuits, wherein each of the controller channel I/O circuits is coupled to a respective one of the plurality of controller channels, and a plurality of memory channel I/O circuits. Each of the memory channel I/O circuits is coupled to a respective one of a plurality of memory channels.

At operation 730, the processing logic can receive, on a particular one of the controller channels, a write request or a read request from the memory sub-system controller. In one embodiment, at least one of the channel mappings can be specified by the write request or the read request from the memory sub-system controller. In another embodiment, at least one of the channel mappings can be specified by a control command received from the memory sub-system controller via at least one of the controller channels. The control command can include a controller channel identifier that specifies the particular one of the controller channels and a memory channel identifier that specifies the particular one of the memory channels.

At operation 740, the processing logic can transfer data between the particular one of the controller channels and a particular one of the memory channels in accordance with the write request or the read request, wherein the particular one of the memory channels is identified by a channel mapping that also identifies the particular one of the controller channels. In one embodiment, the write request or the read request can include a memory address at which data is to be read from or written to. The processing logic can determine a memory die corresponding to the memory address, and at operation 740, the processing logic can transfer data between the particular one of the controller channels and the determined memory die via the particular one of the memory channels.

In one embodiment, at operation 730, the processing logic can receive, on each of the plurality of controller channels, a respective write request or read request from the memory sub-system controller. Operation 740 can then transfer data on each controller channel of the plurality of the controller channels to a respective one of the plurality of memory channels in accordance with the respective write request or read request, wherein the respective one of the memory channels is identified by a channel mapping that also identifies the controller channel. Data can be transferred concurrently on the plurality of controller channels. For example, at least a portion of the data transferred between a first controller channel and a first memory channel can be transferred at the same time as at least a portion of the data transferred between a second controller channel and a second memory channel.

Each respective one of the plurality of memory channels to which data is transferred can be in the same memory device. For example, as shown in FIG. 2, data can be transferred via mappings 211A, 212B to memory dies 220A, 220B, which are both in the same memory device 230A. The channel switch circuit can include one or more pins associated with a channel mapping control signal, and at least one of the channel mappings can be specified by the channel mapping control signal. The controller 115 can specify the channel mapping control signal, for example.

The processing logic can determine one or more logical levels, where each logical level is determined from one of the one or more pins. The processing logic can then determine the channel mapping(s) based on the one or more logical levels. The logical levels can be determined during a period of time in which a write request or a read request is received via at least one of the controller channels. The memory sub-system of claim 11, wherein the one or more logical levels are determined during a period of time in which a write request or a read request is received via at least one of the controller channels.

Figure 8:
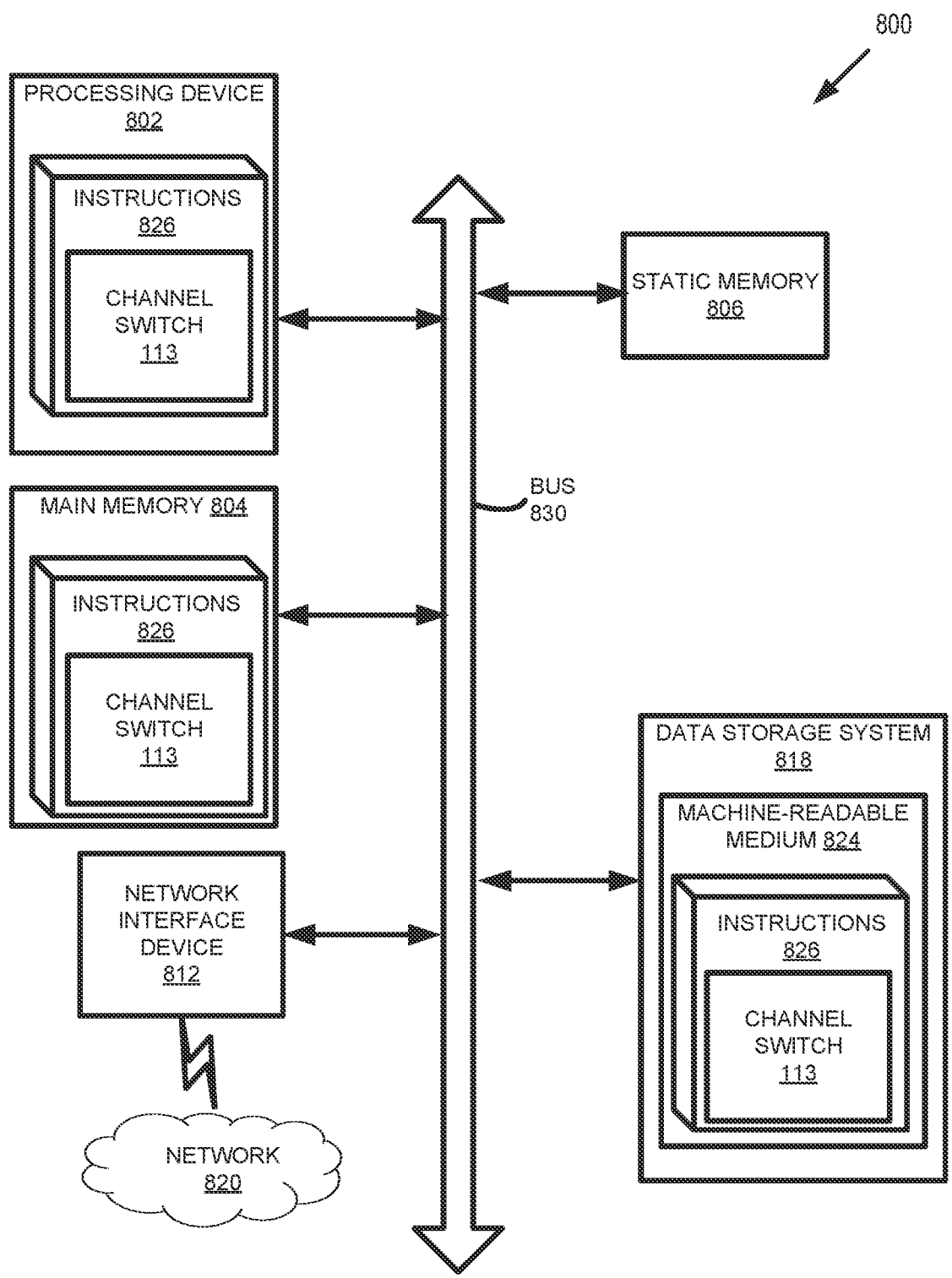
FIG. 8 is a block diagram of an example computer system in which implementations of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a channel switch 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a channel switch (e.g., the channel switch 113A, 113B, or 113C of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
    a memory sub-system controller comprising a plurality of controller channels;
    one or more memory devices comprising a plurality of memory channels, wherein the one or more memory devices comprise a plurality of memory dies, wherein each memory channel of the plurality of memory channels corresponds to a respective one of the plurality of memory dies; and
    a channel switch circuit coupled between the plurality of the controller channels and the plurality of memory channels, wherein each controller channel of the plurality of the controller channels is capable to be mapped to the plurality of memory channels for data routing the channel switch circuit comprising command processing logic configured to:
        receive, from the memory sub-system controller, a plurality of channel mappings, wherein a first channel mapping of the plurality of channel mappings identifies a first controller channel of the plurality of controller channels and one or more first memory channels of the plurality of memory channels, and wherein a second channel mapping of the plurality of channel mappings identifies a second controller channel of the plurality of controller channels and one or more second memory channels of the plurality of memory channels; and
        route, concurrently, data from the first controller channel of the plurality of controller channels to the one or more first memory channels of the plurality of memory channels that are associated with the first controller channel by the first channel mapping of the plurality of channel mappings, and data from the second controller channel of the plurality of controller channels to the one or more second memory channels of the plurality of memory channels that are associated with the second controller channel by the second channel mapping of the plurality of channel mappings.

2. The memory sub-system of claim 1, wherein the command processing logic is further configured to:
    receive, on a particular one of the plurality of controller channels, a memory access request from the memory sub-system controller; and
    transfer data between the particular one of the plurality of controller channels and a particular one of the plurality of memory channels in accordance with the memory access request, wherein the particular one of the plurality of memory channels is identified by a channel mapping of the plurality of channel mappings that also identifies the particular one of the plurality of controller channels.

3. The memory sub-system of claim 2, wherein the memory access request comprises a memory address, and the command processing logic is further configured to:
    determine a memory die corresponding to the memory address, wherein data is transferred between the particular one of the plurality of controller channels and the determined memory die via the particular one of the plurality of memory channels.

4. The memory sub-system of claim 2, wherein at least one of the plurality of channel mappings is specified by the memory access request from the memory sub-system controller.

5. The memory sub-system of claim 1, wherein at least one of the plurality of channel mappings is specified by a control command received from the memory sub-system controller via at least one of the plurality of controller channels.

6. The memory sub-system of claim 5, wherein the control command comprises a controller channel identifier that specifies a particular one of the plurality of controller channels and a memory channel identifier that specifies the particular one of the plurality of memory channels.

7. The memory sub-system of claim 1, wherein the command processing logic is further configured to:
    receive, on each of the plurality of controller channels, a respective memory access request from the memory sub-system controller; and
    transfer, concurrently, data on each controller channel of the plurality of the controller channels to a respective one of the plurality of memory channels in accordance with the respective memory access request, wherein the respective one of the plurality of memory channels is identified by a channel mapping of the plurality of channel mappings that also identifies the controller channel.

8. The memory sub-system of claim 7, wherein each respective one of the plurality of memory channels to which the data is transferred is in a same memory device of the one or more memory devices.

9. The memory sub-system of claim 1, wherein the channel switch circuit comprises:
    a plurality of controller channel Input/Output (I/O) circuits, wherein each of the plurality of controller channel I/O circuits is coupled to a respective one of the plurality of controller channels, and a plurality of memory channel I/O circuits, wherein each of the plurality of memory channel I/O circuits is coupled to a respective one of the plurality of memory channels.

10. The memory sub-system of claim 1, wherein the channel switch circuit comprises one or more pins associated with a channel mapping control signal, and at least one of the plurality of channel mappings is specified by the channel mapping control signal.

11. The memory sub-system of claim 10, wherein the command processing logic is further configured to:
determine one or more logical levels, wherein each logical level of the one or more logical levels is determined from one of the one or more pins; and
determine the at least one of the plurality of channel mappings based on the one or more logical levels.

12. The memory sub-system of claim 11, wherein the one or more logical levels are determined during a period of time in which a write request or a read request is received via at least one of the plurality of controller channels.

13. A channel switch circuit comprising:
a plurality of controller ports, wherein each of the plurality of controller ports is configured to couple to a respective one of a plurality of controller channels of a memory sub-system controller;
a plurality of controller channel Input/Output (I/O) circuits, wherein each of the plurality of controller channel I/O circuits is coupled to a respective one of the plurality of controller ports and configured to send and receive data on the respective controller channel;
a selection circuit coupled to the plurality of controller channel I/O circuits;
a plurality of memory ports, wherein each of the plurality of memory ports is configured to couple to a respective one of a plurality of memory channels of a memory device, wherein the channel switch circuit is coupled between the plurality of the controller channels and the plurality of memory channels, and wherein each controller channel of the plurality of the controller channels is capable to be mapped to the plurality of memory channels for data routing; and
command processing logic configured to:
receive, from the memory sub-system controller, a plurality of channel mappings, wherein a first channel mapping of the plurality of channel mappings identifies a first controller channel of the plurality of controller channels and one or more first memory channels of the plurality of memory channels, and wherein a second channel mapping of the plurality of channel mappings identifies a second controller channel of the plurality of controller channels and one or more second memory channels of the plurality of memory channels, and
route, concurrently, data from the first controller channel of the plurality of controller channels to the one or more first memory channels of the plurality of memory channels that are associated with the first controller channel by the first channel mapping of the plurality of channel mappings, and data from the second controller channel of the plurality of controller channels to the one or more second memory channels of the plurality of memory channels that are associated with the second controller channel by the second channel mapping of the plurality of channel mappings.

14. The channel switch circuit of claim 13, further comprising:
a plurality of memory channel I/O circuits, wherein each of the plurality of memory channel I/O circuits is coupled to a respective one of the plurality of memory ports and configured to send and receive data on the respective memory channel.

15. The channel switch circuit of claim 13, wherein the command processing logic is further configured to:
receive, on a particular one of the plurality of controller channels, a write request or a read request from the memory sub-system controller, wherein the write request or the read request specifies a particular channel mapping; and
responsive to the write request or read request, transfer data between the particular one of the plurality of controller channels and a particular one of the plurality of memory channels that is identified by the particular channel mapping.

16. The channel switch circuit of claim 13, further comprising one or more pins associated with a channel mapping control signal, wherein at least one of the plurality of channel mappings is specified by the channel mapping control signal.

17. A memory device comprising:
a plurality of memory dies; and
at least one channel switch circuit configured to couple to a plurality of controller channels of a memory sub-system controller and coupled to the plurality of memory dies, the at least one channel switch circuit comprising:
a plurality of controller channel Input/Output (I/O) circuits, wherein each of the plurality of controller channel I/O circuits is coupled to a respective one of the plurality of controller channels and configured to send and receive data on the respective one of the plurality of controller channels;
a selection circuit coupled to the plurality of controller channel I/O circuits; and
a channel switch circuit coupled between the plurality of the controller channels and the plurality of memory channels, wherein each controller channel of the plurality of the controller channels is capable to be mapped to the plurality of memory channels for data routing the channel switch circuit comprising command processing logic configured to:
receive, from the memory sub-system controller, a plurality of channel mappings, wherein a first channel mapping of the plurality of channel mappings identifies a first controller channel of the plurality of controller channels and one or more first memory channels of the plurality of memory channels, and wherein a second channel mapping of the plurality of channel mappings identifies a second controller channel of the plurality of controller channels and one of more second memory channels of the plurality of memory channels; and
route, concurrently, data from the first controller channel of the plurality of controller channels to the one or more first memory channels of the plurality of memory channels that are associated with the first controller channel by the first channel mapping of the plurality of channel mappings, and data from the second controller channel of the plurality of controller channels to the one or more second memory channels of the plurality of memory channels that are associated with the second controller channel by the second channel mapping of the plurality of channel mappings.

18. The memory device of claim 17, wherein the command processing logic is further configured to:
receive, on a particular one of the plurality of controller channels, a write request or a read request from the memory sub-system controller, wherein the write request or the read request specifies a particular channel mapping; and
responsive to the write request or read request, transfer data between the particular one of the plurality of controller channels and a particular one of the plurality of memory channels that is identified by the particular channel mapping.

19. The memory device of claim 17, wherein at least one of the plurality of channel mappings is specified by a control command received from the memory sub-system controller via at least one of the plurality of controller channels.

20. The memory device of claim 17, further comprising one or more pins associated with a channel mapping control signal, wherein at least one of the plurality of channel mappings is specified by the channel mapping control signal.

* * * * *